United States Patent Office 3,406,168
Patented Oct. 15, 1968

3,406,168
NOVEL 5,6-DIHYDRO-6-OXO-11H-PYRIDO [2,3-b] [1,4]BENZODIAZEPINES
Günther Schmidt, Biberach an der Riss, Germany, assignor to Boehringer Ingelheim G.m.b.H., Ingelheim am Rhine, Germany, a corporation of Germany
No Drawing. Continuation-in-part of applications Ser. No. 320,935, Nov. 1, 1963, and Ser. No. 369,628, May 22, 1964. This application Dec. 6, 1966, Ser. No. 599,385
Claims priority, application Germany, Nov. 8, 1962, T 22,988; May 31, 1963, T 24,087
15 Claims. (Cl. 260—239.3)

This is a continuation-in-part of copending applications Ser. No. 320,935, filed Nov. 1, 1963, and Ser. No. 369,628, filed May 22, 1964 both now abandoned.

This invention relates to novel 5,6-dihydro-6-oxo-11H-pyrido[2,3-b][1,4]benzodiazepines and their acid addition salts, as well as to a method of preparing these compounds.

More particularly, the present invention relates to compounds of the formula

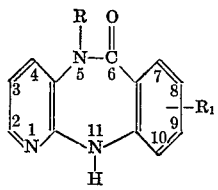

(I)

wherein

R represents (1) hydrogen, (2) cycloalkyl, (3) straight or branched alkyl which may have a halogen, a hydroxyl, a lower alkoxy, an alkylthio or a basic substituent of the formula

attached thereto, where $R_2$ and $R_3$ are identical or different lower alkyl or, together with each other and the adjacent nitrogen atom form a basic heterocycle, or (4) aralkyl whose aromatic moiety may have one or more halogen, lower alkyl, lower alkoxy, amino, monoalkylamino, dialkylamino or acylamino substituents attached thereto, and $R_1$ represents hydrogen, halogen, lower alkyl, methoxy, methylthio, trifluoromethyl or acetyl, and their non-toxic, pharmacologically acceptable acid addition salts formed with an inorganic or organic acid.

The compounds of the Formula I above wherein R is hydrogen may be prepared by reacting a 2-halo-3-amino-pyridine of the formula

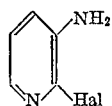

(II)

wherein Hal is halogen, with a reactive derivative, especially an acid halide, of an o-nitrobenzoic acid compound of the formula

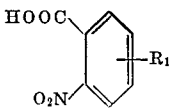

(III)

wherein $R_1$ has the same meanings as in Formula I, to form a 2-halo-3-(o-nitrobenzoylamino)-pyridine of the formula

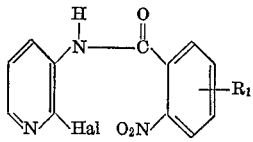

(IV)

wherein $R_1$ has the same meanings as in Formula I and Hal is halogen, reducing the nitro group in intermediate compound IV into an amino group to form a 2-halo-3-(o-aminobenzoylamino)-pyridine of the formula

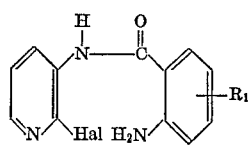

(V)

wherein $R_1$ has the meanings previously defined and Hal is halogen, and subjecting compound V to a ring closure reaction by dehydrohalogenation to form the desired 5,6-dihydro-6-oxo-11H - pyrido[2,3 - b][1,4]benzodiazepine of the Formula I.

The reaction between the 2-halo-3-amino-pyridine II and the reactive derivative of the o-nitrobenzoic acid compound III is advantageously carried out in the presence of an inert organic solvent, such as benzene or toluene, using equimolar amounts of the starting materials. An acid halide of the o-nitrobenzoic acid compound III is preferred as the reactive derivative, and under these circumstances it is necessary to provide a compound in the reaction mixture which ties up or neutralizes the hydrogen halide released by the reaction; suitable such compounds are inorganic or tertiary organic bases, such as alkali metal carbonates, alkali metal bicarbonates, trialkylamines, pyridine and the like. However, a molar excess of the 2-halo-3-amino-pyridine II may also be used as the hydrohalic acid-binding agent. The reaction is advantageously initiated at room temperature and brought to completion at elevated temperatures, preferably at the boiling point of the inert organic solvent.

The reduction of the nitro group of compound IV is carried out in an inert organic solvent, such as methanol, ethanol or dioxane, by means of catalytically activated hydrogen in the presence of a hydrogenation catalyst, preferably Raney-nickel, at a temperature between 20 and 100° C., preferably at 50° C., and most advantageously at superatmospheric pressure. The hydrogenation reduction may, however, also be carried out with the aid of a mixture which releases nascent hydrogen, such as a mixture of a metal or metal salt, for instance, tin chloride, and an inorganic mineral acid. It is surprising that a compound of the Formula V is formed under these conditions, because it is well known that under similar conditions the halogen atom of 2-halo-pyridines is split off.

The ring closure reaction, that is, the conversion of the 2-halo-3-(o-aminobenzoylamino)-pyridine V into the 5,6-dihydro-6-oxo - 11H - pyrido[2,3-b][1,4]benzodiazepine I, is effected by heating compound V to a temperature above 200° C., most advantageously in the presence of a high-boiling-point solvent, such as paraffin oil or decahydronaphthalene, and of a dehydrohalogenation catalyst, especially a basic catalyst such as potash, or copper powder.

The compounds of the Formula I, wherein R has the indicated meanings other than hydrogen, may be prepared by first converting a 5,6-dihydro-6-oxo-11H-pyrido-[2,3-b][1,4]benzodiazepine of the formula

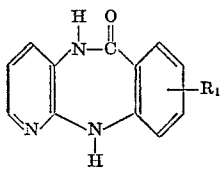

(VI)

wherein $R_1$ has the same meanings as in Formula I, into its 5-alkali metal analog of the formula

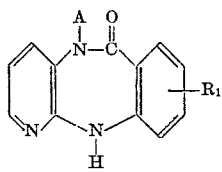

(VII)

wherein A is an alkali metal and $R_1$ has the same meanings as in Formula I, and thereafter reacting said alkali metal analog with a compound of the formula

RX            (VIII)

wherein R has the same meanings as in Formula I except hydrogen and X is a halogen atom.

The transformation of compound VI into its alkali metal analog VII may be accomplished, for example, by reacting compound VI with an alkali metal hydroxide, an alkali metal alcoholate, an alkali metal amide or an alkali metal hydride. The reaction is preferably performed at elevated temperatures in the presence of a substantially anhydrous inert organic solvent. When an alkali metal hydroxide is used, an aqueous inert organic solvent may also be employed.

The solution or suspension of the alkali metal analog VII thus obtained may then be reacted directly with compound VIII at elevated temperatures, preferably at the boiling point of the particular inert organic solvent or at the boiling point of compound VIII. Most surprisingly, the radical R of compound VIII thereby attaches itself only to the nitrogen atom in the 5-position of compound VII.

The reaction product thus obtained may be isolated by customary methods and may, if desired, be purified by conversion into an acid addition salt and subsequent reconversion into the free base.

The conversion of the free bases of the Formula I into their acid addition salts may be effected by customary methods, that is, for example, by taking up the free base in a suitable inert solvent and acidifying the solution with the desired inorganic or organic acid. Those compounds of the Formula I wherein R is a basic substituent form acid addition salts with one or two equivalents of the acid, whereas those wherein R is other than a basic substituent form acid addition salts with one equivalent of the acid.

The following examples further illustrate the present invention and will enable others skilled in the art to understand it more completely. It should be understood, however, that the invention is not limited to the particular examples given below.

Example 1.—Preparation of 5,6-dihydro-6-oxo-11H-pyrido[2,3-b][1,4]benzodiazepine (a) A solution of 3.6 gm. (0.019 mol) of o-nitrobenzoylchloride in 50 cc. of absolute benzene was added dropwise at room temperature and while stirring to a solution of 5 gm. (0.0388 mol) of 2-chloro-3-amino-pyridine. After all of the o-nitrobenzoylchloride solution had been added, the mixture was stirred for one more hour and was then briefly heated to its boiling point. Thereafter, the precipitated 2-chloro-3-amino-pyridine hydrochloride was separated by vacuum filtration. The filtrate was allowed to cool, whereby 5.2 gm. (97% of theory) of 2-chloro-3-(2′-nitrobenzoyl-amino)-pyridine of the formula

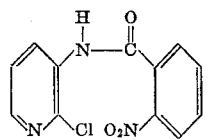

crystallized out in the form of fine needles. The crystalline product was recrystallized from butanol, whereupon it had a melting point of 158–161.5° C.

Analysis.—$C_{12}H_8ClN_3O_3$; molecular weight 277.6. Calculated: C, 51.90%; H, 2.90%; N, 15.14%. Found: C, 51.90%; H, 2.95%; N, 15.09%.

(b) 20 gm. (0.072 mol) of 2-chloro-3-(2′-nitro-benzoyl-amino)-pyridine were dissolved in 150 cc. of dioxane, and the solution was hydrogenated at 50° C. and 100 atmospheres gauge in the presence of 10 gm. of Raney-nickel as a catalyst. The calculated amount of hydrogen was absorbed in one hour. Thereafter, the catalyst was filtered off and the filtrate was evaporated in vacuo. The residue was recrystallized from isopropanol. 17.5 gm. (98% of theory) of 2-chloro-3-(2′-aminobenzoylamino)-pyridine of the formula

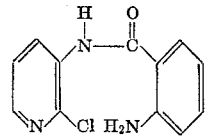

were obtained in the form of silky leaflets having a melting point of 168–172° C.

Analysis.—$C_{12}H_{10}ClN_3O$; molecular weight 247.7. Calculated: C, 58.19%; H, 4.07%; N, 16.96%. Found: C, 57.90%; H, 4.13%; N, 17.23%.

(c) 5 gm. of 2-chloro-3-(2′-aminobenzoyl-amino)-pyridine were heated to 200–210° C., accompanied by stirring. After the molten compound had been maintained at that temperature for about 5 minutes, evolution of gaseous hydrogen chloride began along with foaming. At that time the source of heat was immediately withdrawn, and the molten mass was allowed to cool while stirring. The cool solidified melt was pulverized and was then dissolved in 300 cc. of hot ethanol to which 1 cc. of an aqueous 30% solution of sodium hydroxide had been added. The resulting solution was allowed to cool, whereby a yellowish substance crystallized out in the form of small needles. The crystalline substance was separated and identified as raw 5,6-dihydro-6-oxo-11H-pyrido-[2,3-b] - [1,4] - benzodiazepine of the formula

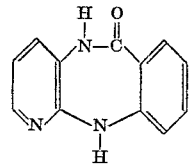

The yield was 2.5 gm. (60% of theory). After recrystallization from cyclohexanol the compound had a melting point of 278° C.

Analysis.—$C_{12}H_9N_3O$; molecular weight 211.2. Calculated: C, 68.25%; H, 4.29%; N, 19.89%. Found: C, 68.80%; H, 4.46%; N, 20.10%.

Its hydrobromide, obtained by acidifying an ethanolic solution of the free base with ethanolic hydrobromic acid, had a melting point of 280° C.

Analysis.—$C_{12}H_{10}BrN_3O$; molecular weight 292.2. Calculated: Br, 27.36%. Found: Br, 27.01%.

Example 2

The three-step procedure described in Example 1 was repeated except that the 2-chloro-3-(2′-aminobenzoylamino)-pyridine was prepared in the following manner:

2.5 gm. of 2-chloro-3-(2′-nitrobenzoyl-amino)-pyridine in admixture with 11.0 gm. of tin-(II)-chloride and 36 cc. of concentrated hydrochloric acid were refluxed for three hours in 40 cc. of ethanol. Thereafter, the reaction mixture was allowed to cool. The crystalline precipitate formed thereby was separated and was dissolved in water which had been made weakly alkaline with sodium hydroxide. Raw 2-chloro-3-(2'-aminobenzoyl-amino)-pyridine separated out of this alkaline solution in the form of white crystals. After recrystallization from isopropanol the product had a melting point of 170–172° C. The yield was about 90% of theory.

Example 3.—Preparation of 5,6-dihydro-6-oxo-9-chloro-11H-pyrido-[2,3-b]-[1,4]-benzodiazepine A solution of 65 gm. (0.295 mol) of o-nitro-p-chloro-benzoylchloride in 200 cc. of absolute benzene was added dropwise at room temperature to a solution of 76 gm. (0.59 mol) of 2-chloro-3-amino-pyridine in 200 cc. of absolute benzene, accompanied by stirring. After all of the o-nitro-p-chloro-benzoylchloride solution had been added, the mixture was stirred for one more hour and was then briefly heated to its boiling point. Thereafter, the benzene was evaporated in vacuo. The residue was admixed with about 300 cc. of hot water wherein the 2-chloro-3-amino-pyridine hydrochloride formed as a side product during the reaction dissolved, while the principal reaction product remained undissolved. The undissolved portion was separated and recrystallized from butanol. 75 gm. (81.5% of theory) of 2-chloro-3-(2'-nitro-4'-chlorobenzoyl-amino)-pyridine of the formula

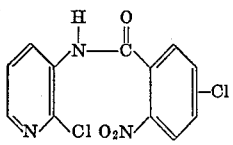

were obtained in the form of crystalline needles having a melting point of 205° C.

(b) 59 gm. (0.188 mol) of 2-chloro-3-(2'-nitro-4'-chlorobenzoyl-amino)-pyridine were dissolved in 450 cc. of dioxane, and the solution was hydrogenated at 50° C. and 100 atmospheres gauge in the presence of 25 gm. of Raney-nickel as a catalyst. The calculated amount of hydrogen was absorbed after 1¼ hours. The catalyst was filtered off, and the filtrate was evaporated in vacuo. The residue was recrystallized from ethanol. 49 gm. (92.5% of theory) of 2 - chloro-3-(2'-amino-4'-chloro-benzoyl-amino)-pyridine of the formula

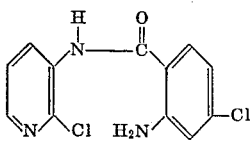

were obtained in the form of needles having a melting point of 202° C.

(c) 5 gm. of 2-chloro-3-(2'-amino-4-chloro-benzoyl-amino)-pyridine were heated to 210–230° C., accompanied by stirring, and as soon as the evolution of hydrogen chloride began, the source of heat was withdrawn. Thereafter, the melt was worked up as described in Example 1(c). 3 gm. (67.5% of theory) of raw 5,6-dihydro - 6 - oxo - 9-chloro-11H-pyrido-[2,3-b]-[1,4]-benzodiazepine of the formula

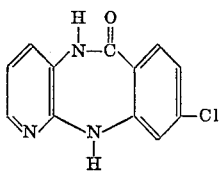

were obtained in the form of yellowish needles. After recrystallization from dimethylformamide the product had a melting point above 340° C.

Analysis.—$C_{12}H_8ClN_3O$; molecular weight 245.7. Calculated: C, 58.66%; H, 3.28%; N, 17.11%; Cl, 14.43%. Found: C, 58.70%; H, 3.33%; N, 17.06%; Cl, 14.62%.

Example 4.—Preparation of 5,6-dihydro-6-oxo-8-methyl-11H-pyrido-[2,3-b]-[1,4]-benzodiazepine A solution of 5.2 gm. (0.04 mol) of 2-chloro-3-amino-pyridine in 75 cc. of absolute benzene was added dropwise at room temperature over a period of 10 minutes to a solution of 8 gm. (0.04 mol) of 6-nitro-3-methyl-benzoylchloride and 4.3 gm. of pyridine in 75 cc. of absolute benzene, accompanied by stirring. Thereafter, the mixture was refluxed for one hour, and the precipitated pyridine hydrochloride was filtered off while the reaction mixture was still hot. The filtrate was allowed to cool, whereby a precipitate of white crystalline needles formed. The precipitate was separated and recrystallized from ethanol. It was identified to be 2-chloro-3-(2'-nitro-5'-methyl-benzoylamino)-pyridine of the formula

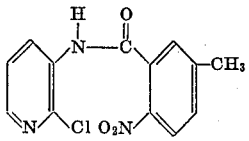

having a melting point of 154–155° C. The yield was about 70% of theory.

(b) The intermediate 2 - chloro-3-(2'-nitro-5'-methyl-benzoylamino)-pyridine thus obtained was hydrogenated in dioxane solution in the presence of Raney nickel in a manner analogous to that described in Example 1(b). The raw 2-chloro-3-(2'-amino-5'-methyl-benzoylamino)-pyridine of the formula

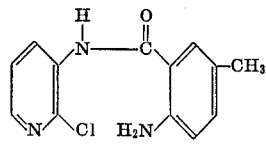

obtained in this manner was recrystallized from ethanol, whereupon it had a melting point of 186–188° C.

(c) The cyclization of 2-chloro-3-(2'-amino-5'-methyl-benzoylamino)-pyridine was effected in the same manner as in Example 1(c), that is, by heating it above its melting point until evolution of hydrogen chloride began and working up the solidified melt. 5,6-dihydro-6-oxo-8-methyl-11H-pyrido[2,3-b][1,4]benzodiazepine of the formula

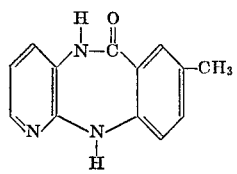

was obtained in the form of yellow needles. After recrystallization from ethanol the compound had a melting point of 249–251° C.

Analysis.—$C_{13}H_{11}N_3O$; molecular weight 225.2. Calculated: C, 69.32%; H, 4.92%; N, 18.66%. Found: C, 69.10%; H, 5.10%; N, 18.35%.

Example 5.—Preparation of 5-methyl-5,6-dihydro-6-oxo-11H-pyrido[2,3-b][1,4]benzodiazepine 5 gm. of 5,6-dihydro-6-oxo-11H-pyrido[2,3-b][1,4]benzodiazepine were dissolved in a mixture consisting of 100 cc. of hot ethanol and 7 cc. of aqueous 30% sodium hydroxide. Thereafter, 40 cc. of methyliodide were added to the solution, and the resulting mixture was refluxed for seven hours. The reaction mixture was then evaporated to dryness in vacuo. The residue was washed with aqueous 5% sodium hydroxide and was then recrystallized from ethanol. The product, which was obtained in the form of crystalline needles, had a melting point of 210–213° C. and was identified to be the compound of the formula

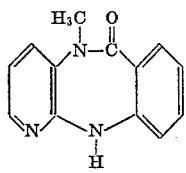

The yield was more than 90% of theory.

*Analysis.*—$C_{13}H_{11}N_3O$; molecular weight 225.3. Calculated: C, 69.29%; H, 4.92%; N, 18.65%. Found: C, 69.30%; H, 5.11%; N, 18.65%.

Example 6.—Preparation of 5-ethyl-5,6-dihydro-6-oxo-11H-pyrido[2,3-b][1,4]benzodiazepine 5 gm. of 5,6-dihydro-6-oxo-11H-pyrido[2,3-b][1,4]benzodiazepine were dissolved in a hot mixture consisting of 80 cc. of ethanol and 10 cc. of aqueous 30% sodium hydroxide; 40 cc. of ethyliodide were added to the solution, and the mixture was refluxed for five hours. Thereafter, the solvent was evaporated in vacuo, and the residue was admixed with 50 cc. of aqueous 10% hydrochloric acid. The resulting mixture was filtered to remove a small amount of unreacted starting material. The filtrate was made alkaline with sodium hydroxide, whereupon a light yellow precipitate formed, which was filtered off, washed with water and recrystallized from ethanol. A crystalline substance having a melting point of 129–131° C. was obtained. It was identified to be the compound of the formula

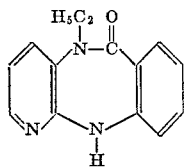

The yield was 97% of theory.

*Analysis.*—$C_{14}H_{13}N_3O$; molecular weight 239.3. Calculated: C, 70.28%; H, 5.47%; N, 17.56%. Found: C, 69.80%; H, 5.46%; N, 17.70%.

Example 7.—Preparation of 5-n-propyl-5,6-dihydro-6-oxo-11H-pyrido[2,3-b][1,4]benzodiazepine Using a procedure analogous to that described in Example 5, but substituting n-propyliodide for methyliodide, the compound of the formula

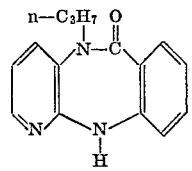

was prepared. Recrystallized from ethanol, the reaction product had a melting point of 178–180° C.

*Analysis.*—$C_{15}H_{15}N_3O$; molecular weight 253.3. Calculated: C, 71.13%; H, 5.96%; N, 16.59%. Found: C, 71.20%; H, 6.09%; N, 16.42%.

Example 8.—Preparation of 5-methyl-5,6-dihydro-6-oxo-9-chloro-11H-pyrido[2,3-b][1,4]benzodiazepine 0.5 gm. of sodium was dissolved in 100 cc. of n-butanol, the solution was heated to 90° C., and then 2.5 gm. of 5,6 - dihydro - 6 - oxo - 9 - chloro - 11H - pyrido[2,3-b][1,4]benzodiazepine were added thereto. The resulting mixture was allowed to cool to about 70° C., whereupon 40 cc. of methyliodide were added dropwise. The mixture was stirred for eight hours at 70° C., allowed to cool to room temperature, and the crystalline needles precipitated thereby were separated by vacuum filtration. The filter cake was washed with water and was recrystallized from isopropanol. The product, having a melting point of 225–226° C., was identified to be the compound of the formula

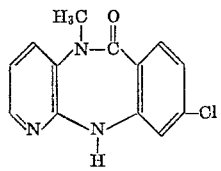

*Analysis.*—$C_{13}H_{10}ClN_3O$; molecular weight 259.7. Calculated: C, 60.13%; H, 3.88%; N, 16.19%. Found: C, 60.00%; H, 4.06%; N, 16.45%.

Example 9.—Preparation of 5-ethyl-5,6-dihydro-6-oxo-9-chloro-11H-pyrido[2,3-b][1,4]benzodiazepine Using a procedure analogous to that described in Example 8, but substituting ethyliodide for methyliodide, the compound of the formula

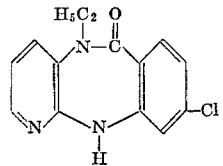

was prepared. Recrystallized from dilute ethanol, the product was obtained in the form of white needles having a melting point of 180–181° C.

*Analysis.*—$C_{14}H_{12}ClN_3O$; molecular weight 273.7. Calculated: C, 61.44% H, 4.42%; Cl, 12.95%. Found: C, 61.35%; H, 4.56%; Cl, 12.80%.

Example 10.—Preparation of 5-benzyl-5,6-dihydro-6-oxo-11H-pyrido[2,3-b][1,4]benzodiazepine 4.2 gm. (0.02 mol) of 5,6-dihydro-6-oxo-11H-pyrido-[2,3-b][1,4]benzodiazepine were dissolved in a boiling ethanolic sodium ethylate solution, which had been prepared from 0.8 gm. (0.035 gram atom) of sodium and 80 cc. of absolute ethanol. 120 cc. of absolute xylene were added, and then the ethanol was distilled off, whereby a suspension of 5-sodium-5,6-dihydro-6-oxo-11H-pyrido[2,3-b][1,4]benzodiazepine in xylene was obtained. A solution of 4.4 gm. (0.035 mol) of benzylchloride in 50 cc. of absolute xylene was added dropwise to the suspension, and the mixture was refluxed for six hours. Thereafter, the reaction mixture was allowed to cool and was then extracted with aqueous 10% hydrochloric acid. The hydrochloric acid phase was separated, made alkaline with sodium hydroxide, and the alkaline solution was extracted with chloroform. The chloroform extract solution was dried over sodium sulfate and was then evaporated to dryness. The residue was recrystallized from ethanol. The resulting product, having a melting point of 155–156° C., was identified to be the compound of the formula

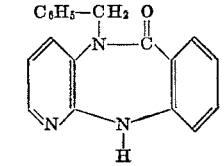

The yield was 65% of theory.

*Analysis.*—$C_{19}H_{13}N_3O$; molecular weight 299.3. Calculated: N, 14.04%. Found: N, 13.78%.

Example 11.—Preparation of 5-(β-dimethylamino-ethyl)-5,6 - dihydro - 6 - oxo - 11H - pyrido[2,3-b][1,4]benzodiazepine 0.25 gm. (0.011 gram atom) of sodium was dissolved in 100 cc. of absolute ethanol, yielding an ethanolic solution of sodium ethylate. 2.11 gm. (0.01 mol) of 5,6-dihydro - 6 - oxo - 11H - pyrido[2,3-b][1,4]benzodiazepine were added to the sodium ethylate solution, and the mixture was refluxed. Thereafter, the resulting solution was admixed with 150 cc. of absolute toluene, and the ethanol was distilled off, yielding a suspension of 5-sodium-5,6-dihydro - 6 - oxo-11H-pyrido[2,3-b][1,4]benzodiazepine in toluene. The suspension was heated to 110° C., and then a solution of 2.15 gm. (0.02 mol) of β-dimethyl-amino-ethylchloride in 50 cc. of absolute toluene were added, and the mixture was refluxed for three hours. Thereafter, the reaction mixture was worked up as described in Example 6. The raw product was recrystallized from cyclohexane, whereupon it had a melting point of 135–137° C. It was identified to be the compound of the formula

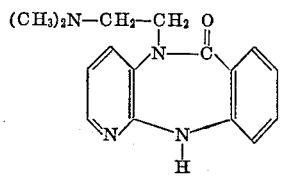

The yield was about 70% of theory.

The hydrochloride, obtained by admixing the free base with one mol equivalent of ethereal hydrochloric acid, was recrystallized from isopropanol, whereupon it had a melting point of 278° C.

*Analysis.*—$C_{16}H_{18}N_4O \cdot HCl$; molecular weight 318.8. Calculated: C, 60.28%; H, 6.01%; N, 17.58%; basic N, 8.79%. Found: C, 60.50%; H, 6.11%; N, 17.40%; basic N, 8.75%.

Example 12.—Preparation of 5 - (γ - dimethylamino-n-propyl)-5,6 - dihydro-6-oxo-11H - pyrido[2,3-b][1,4]-benzodiazepine Using a procedure analogous to that described in Example 11 but substituting γ-dimethylamino-n-propyl chloride for β-dimethylamino-ethyl chloride and xylene for toluene, the compound of the formula

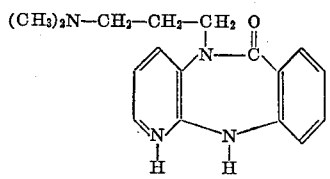

was prepared. The raw product was an oily substance having a boiling point of 185–187° C. at 0.04 mm. Hg; recrystallized from gasoline, the purified product had a melting point of 90–93° C.

*Analysis.*—$C_{17}H_{20}N_4O$; molecular weight 296.4. Calculated: C, 68.89%; H, 6.80%; N, 18.91%. Found: C, 68.70%; H, 6.52%; N, 18.53%.

The dihydrochloride, obtained by admixing the free base with 2 mol equivalents of ethereal hydrochloric acid, had a melting point of 225–226° C. after recrystallization from absolute ethanol.

*Analysis.*—$C_{17}H_{20}N_4O \cdot 2HCl$; molecular weight 369.3. Calculated: C, 55.29%; H, 6.00%; N, 15.17%; Cl, 19.20%. Found: C, 55.50%; H, 6.09%; N, 14.79%; Cl, 18.85%.

Example 13.—Preparation of 5-(β-dimethylamino-ethyl)-5,6-dihydro-6-oxo-9 - chloro-11H - pyrido[2,3-b][1,4]-benzodiazepine 0.5 gm. (0.022 mol) of sodium were dissolved in 100 cc. of n-butanol. 4.9 gm. (0.02 mol) of 5,6-dihydro-6-oxo-9-chloro-11H - pyrido[2,3 - b][1,4]benzodiazepine were added to the solution, and the mixture was refluxed to dissolve the pyridobenzodiazepine compound. Thereafter, the solution was admixed with 150 cc. of absolute xylene and the butanol was distilled off, yielding a suspension of 5-sodium-5,6-dihydro-6-oxo-9-chloro-11H - pyrido[2,3-b][1,4]benzodiazepine in xylene. 4.3 gm. (0.04 mol) of β-dimethylamino-ethyl chloride were added dropwise to the suspension, and the mixture was refluxed for three hours.

Thereafter, the reaction mixture was worked up as described in Example 7. The raw reaction product was recrystallized from dilute ethanol, whereupon it had a melting point of 148–151° C. It was identified to be the free base of the formula

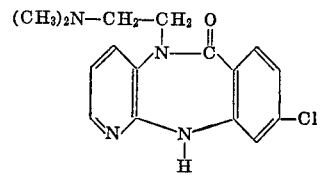

The hydrochloride, obtained by admixing the free base with one mol equivalent of ethereal hydrochloric acid, had a melting point of 269–271° C. after recrystallization from isopropanol.

*Analysis.*—$C_{16}H_{17}ClN_4O \cdot HCl$; molecular weight 353.3. Calculated: C, 54.40%; H, 5.14%; N, 15.86%; Cl, 20.08. Found: C, 54.10%; H, 5.19%; N, 16.25%; Cl, 19.80%.

Example 14.—Preparation of 5-n-propyl-5,6-dihydro-6-oxo-9-chloro-11H-pyrido[2,3-b][1,4]benzodiazepine A mixture consisting of 4.5 gm. (0.018 mol) of 5,6-dihydro-6-oxo-9-chloro - 11H - pyrido[2,3 - b][1,4]benzo-diazepine, 20 gm. (0.16 mol) n-propyl bromide, 20 cc. of aqueous 30% sodium hydroxide and 200 cc. of isopropanol were refluxed for four hours while stirring. The reaction solution was then evaporated in vacuo, the residue was washed with water and was finally recrystallized from ethanol. The product had a melting point of 164° C. and was identified to be the compound of the formula

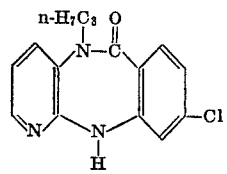

The yield was 65% of theory.

*Analysis.*—$C_{15}H_{14}ClN_3O$; molecular weight 287.8. Calculated: Cl, 12.35%. Found: Cl, 12.05%.

Example 15.—Preparation of 5-benzyl-5,6-dihydro-6-oxo-9-chloro-11H-pyrido[2,3-b][1,4]benzodiazepine Using a procedure analogous to that described in Example 14, but substituting benzyl chloride for n-propyl bromide, the compound of the formula

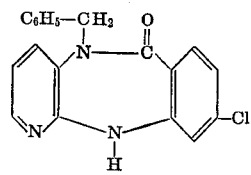

was prepared. Recrystallized from ethanol, the product had a melting point of 191° C.

*Analysis.*—$C_{19}H_{14}ClN_3O$; molecular weight 335.8. Calculated: Cl, 10.58%. Found: Cl, 10.70%.

Example 16.—Preparation of 5,8-dimethyl-5,6-dihydro-6-oxo-11H-pyrido[2,3-b][1,4]benzodiazepine Using a procedure analogous to that described in Example 5, the compound of the formula

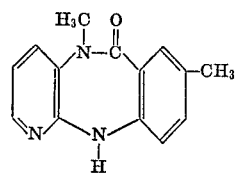

was prepared from 5,6-dihydro-6-oxo-8-methyl-11H-pyrido[2,3 - b][1,4]benzodiazepine and methyl iodide. The product had a melting point of 184–186° C. after recrystallization from ethanol.

*Analysis.*—$C_{14}H_{13}N_3O$; molecular weight 239.3 Calculated: C, 70.27%; H, 5.47%; N, 17.56%. Found: C, 70.40%; H, 5.70%; N, 17.75%.

Example 17.—Preparation of 5-ethyl-5,6-dihydro-6-oxo-8-methyl-11H-pyrido[2,3-b][1,4]benzodiazepine Using a procedure analogous to that described in Example 6, the compound of the formula

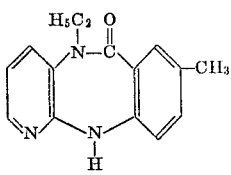

was prepared from 5,6-dihydro-6-oxo-8-methyl-11H-pyrido[2,3-b][1,4]benzodiazepine and ethyl iodide. The product had a melting point of 198–200° C. after recrystallization from ethanol.

*Analysis.*—$C_{15}H_{15}N_3O$; molecular weight 253.3. Calculated: C, 71.12%; H, 5.96%; N, 16.98%. Found: C, 70.80%; H, 6.02%; N, 17.15%.

Example 18.—Preparation of 5-(β-dimethylamino-ethyl)-5,6-dihydro-6-oxo-8-methyl-11H - pyrido[2,3-b][1,4]-benzodiazepine Using a procedure analogous to that described in Example 11 the compound of the formula

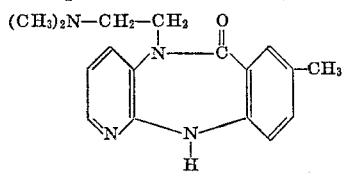

was prepared from 5,6-dihydro-6-oxo-8-methyl-11H-pyrido[2,3-b][1,4]benzodiazepine and β-dimethylaminoethyl chloride. The raw product was an oily substance having a boiling point of 215–220° C. at 0.04 mm. Hg.

*Analysis.*—$C_{17}H_{20}N_4O$; molecular weight 296.4. Calculated: C, 68.89%; H, 6.80%; N, 18.91%: Found: C, 68.20%; H, 7.01%; N, 18.52%.

Example 19.—Preparation of 5-(γ-dimethylamino-n-propyl)-5,6-dihydro - 6-oxo - 9 - chloro-11H-pyrido[2,3-b][1,4]benzodiazepine Using a procedure analogous to that described in Example 14, the compound of the formula

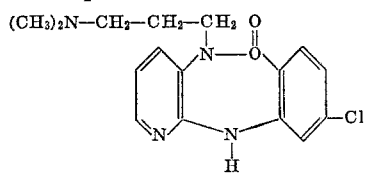

was prepared from 5,6-dihydro-6-oxo-9-chloro-11H-pyrido[2,3-b][1,4]benzodiazepine and γ-dimethylamino-n-propyl chloride hydrochloride. The product had a melting point of 130–132° C. after recrystallization from ethanol.

*Analysis.*—$C_{17}H_{19}ClN_4O$; molecular weight 330.8. Calculated: Cl, 10.72%. Found: Cl, 10.90%.

Example 20.—Preparation of 5-(β-piperidino-ethyl)-5,6-dihydro-6-oxo-9-chloro-11H - pyrido[2,3-b][1,4]benzodiazepine 0.02 mol of 5,6-dihydro-6-oxo-9-chloro-11H-pyrido-[2,3-b][1,4]benzodiazepine were suspended in 150 cc. of isopropanol, and the suspension was admixed with 100 cc. of ethanolic 10% potassium hydroxide. The resulting mixture was heated to about 80° C., whereupon a clear solution was formed, to which a solution of 0.1 mol of β-chloroethyl-piperidine hydrochloride in 150 cc. of ethanol was added dropwise. The resulting mixture was refluxed for two hours, accompaanied by stirring. Thereafter, the reaction solution was evaporated in vacuo, the residue was taken up in chloroform and the chloroform solution was washed with water, dried over sodium sulfate and evaporated to dryness. The residue was recrystallized from ethyl acetate, yielding a crystalline substance having a melting point of 153–154° C. It was identified to be the compound of the formula

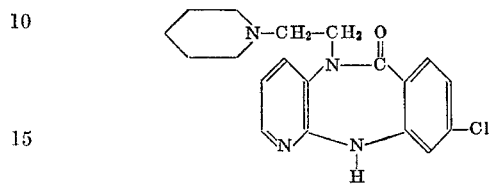

*Analysis.*—$C_{19}H_{21}ClN_4O$; molecular weight 356.9. Calculated: Basic N, 7.84%. Found: Basic N, 7.70%.

Example 21.—Preparation of 5-isobutyl-5,6-dihydro-6-oxo-11H-pyrido[2,3-b][1,4]benzodiazepine Using a procedure analogous to that described in Example 14, the compound of the formula

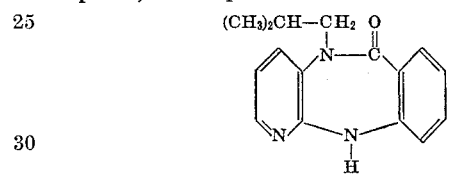

was prepared from 5,6-dihydro-6 - oxo-11β-pyrido[2,3-b][1,4]benzodiazepine and isobutyl bromide, Recrystallized from ethanol, the product had a melting point of 206–207° C.

*Analysis.*—$C_{16}H_{17}N_3O$; molecular weight 267.3. Calculated: C, 71.91%; H, 6.41%. Found: C, 71.60%; H, 6.30%.

Example 22.—Preparation of 5 - (γ - dimethylamino-n-propyl)-5,6-dihydro-6-oxo-8-methyl - 11H-pyrido[2,3-b][1,4]benzodiazepine Using a procedure analogous to that described in Example 10 to compound of the formula

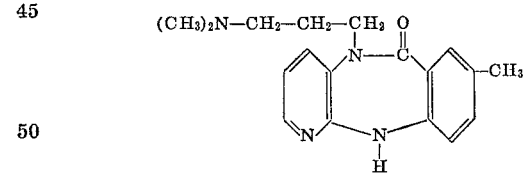

was prepared from 5,6-dyhydro - 6 - oxo-8-methyl-11H-pyrido[2,3-b][1,4]benzodiazepine and γ-dimethylamino-n-propyl chloride. The raw product was an oily substance having a boiling point of 197° C. at 0.06 mm. Hg. After recrystallization from petroleum ether the product had a melting point of 99–101° C.

*Analysis.*—$C_{18}H_{22}N_4O$; molecular weight 310.3. Calculated: N, 18.05%. Found: N, 17.76%.

Example 23.—Preparation of 5-(p-chlorobenzyl)-5,6-dihydro-6-oxo-11H-pyrido[2,3-b][1,4]benzodiazepine Using a procedure analogous to that described in Example 14, the compound of the formula

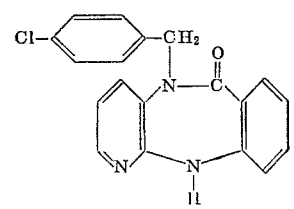

was prepared by refluxing a mixture consisting of 0.03 mol of 5,6-dihydro-6-oxo-11H-pyrido[2,3-b][1,4]benzodiazepine, 0.2 mol of p-chlorobenzyl chloride, 40 cc. of aqueous 30% sodium hydroxide and 300 cc. of isopropanol. Recrystallized from ethanol, the product had a melting point of 169–171° C.

*Analysis.*—$C_{19}H_{14}ClN_3O$; molecular weight 335.8. Calculated: C, 67.96%; H, 4.20%; Cl, 10.56%. Found: C, 68.20%; H, 4.07%; Cl, 10.63%.

Example 24.—Preparation of 5-(β-morpholino-ethyl)-5,6-dihydro - 6 - oxo-11H-pyrido[2,3-b][1,4]benzodiazepine 9 gm. (0.044 mol) of 5,6-dihydro-6-oxo-11H-pyrido[2,3-b][1,4]benzodiazepine were dissolved in a warm solution of 22 gm. of potassium hydroxide in 400 cc. of isopropanol. The resulting solution was heated to the boiling point; a warm solution of 37 gm. (0.2 mol) of β - morpholino-ethyl chloride hydrochloride was added dropwise thereto, and the resulting mixture was refluxed for four hours. The potassium chloride which separated out during refluxing was filtered off, the filtrate was evaporated in vacuo and the residue was dissolved in dilute hydrochloric acid. The resulting solution was filtered through activated charcoal, made alkaline with sodium hydroxide, and extracted with chloroform. The chloroform extract solution was evaporated in vacuo, and the residue was recrystallized from ethyl acetate. The product, which had a melting point of 151–152° C., was identified to be the compound of the formula

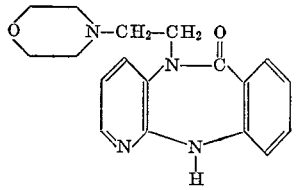

*Analysis.*—$C_{18}H_{20}N_4O_2$; molecular weight 324.4. Calculated: C, 66.65%; H, 6.22%. Found: C, 66.70; H, 6.47%.

Example 25.—Preparation of 5-(β-methoxyethyl)-5,6-dihydro-6-oxo-11H-pyrido[2,3-b][1,4]benzodiazepine 2.5 gm. (0.064 gram atom) of potassium were added to 150 cc. of isopropanol, yielding a solution of potassium isopropylate in isopropanol. The solution was warmed and 10.5 gm. (0.05 mol) of 5,6-dihydro-6-oxo-11H - pyrido[2,3 - b][1,4]benzodiazepine were dissolved therein. The resulting solution was refluxed for one hour. Thereafter, 200 cc. of absolute xylene were added, and the isopropanol was distilled off, yielding a suspension of 5-potassium-5,6 - dihydro - 6 - oxo-11H-pyrido[2,3-b][1,4]benzodiazepine in xylene. To the boiling suspension a solution of 12 gm. (0.064 mol) of β-methoxyethyl iodide in 50 cc. of absolute xylene was added dropwise. Thereafter, the resulting mixture was refluxed for fifteen hours, filtered, the filtrate was evaporated to dryness in vacuo, and the residue was recrystallized from ethanol. The product, which had a melting point of 151–153° C., was identified to be the compound of the formula

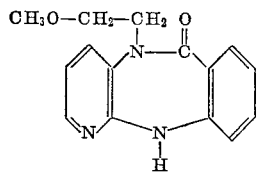

*Analysis.*—$C_{15}H_{15}N_3O_2$; molecular weight 269.3. Calculated: C, 66.90%; H, 5.61%; N, 15.61%. Found: C, 67.15%; H, 5.68%; N, 15.55%.

Example 26.—Preparation of 5-(γ-chloro-n-propyl)-5,6-dihydro-6-oxo-11H-pyrido[2,3-b][1,4]benzodiazepine 157.5 gm. (1 mol) of 1-bromo-3-chloro-propane were dissolved in 150 cc. of absolute ethanol, the solution was heated to the boiling point and, while the solution was boiling, a solution of 6.3 gm. (0.03 mol) of 5,6-dihydro-6-oxo-11H-pyrido[2,3-b][1,4]benzodiazepine and 17 gm. (0.3 mol) of potassium hydroxide in 250 cc. of absolute ethanol was added dropwise over a period of thirty minutes. The resulting mixture was then refluxed for six hours while stirring. Thereafter, the reaction solution was filtered, and the filtrate was evaporated in vacuo. The residue was extracted with chloroform, the chloroform extract solution was evaporated to dryness in vacuo, and the residue was recrystallized from ethyl acetate. A white crystalline substance was obtained, which had a melting point of 151° C. and was identified to be the compound of the formula

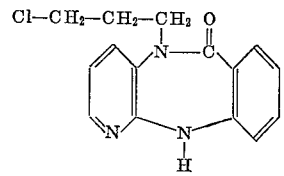

*Analysis.*—$C_{15}H_{14}N_3ClO$; molecular weight 287.8. Calculated: C, 62.61%; H, 4.90%; N, 14.61%. Found: C, 62.30%; H,4.85%; N, 14.32%.

The novel compounds according to the present invention, that is, those embraced by Formula I above and their non-toxic, pharmacologically acceptable acid addition salts, have useful pharmacodynamic properties. More particularly, they exhibit antipyretic, antiphlogistic, sedative and analgesic activities in warm-blooded animals. Those compounds of the Formula I wherein R is a basic substituent and their non-toxic, pharmacologically acceptable acid addition salts also exhibit anti-histaminic properties and antagonize the sedative activity of reserpine in warm-blooded animals.

Examples of pharmacologically acceptable non-toxic acid addition salts of the novel pyridobenzodiazepines according to the present invention are those formed with hydrochloric acid, hydrobromic acid, sulfuric acid, phosphoric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicylic acid, nicotinic acid, 2-furoic acid, 8-chlorotheophylline, and the like.

For therapeutic purposes the compounds of the present invention are administered to warm-blooded animals by the oral, parenteral or rectal route as active ingredients in customary dosage unit compositions, that is, compositions consisting essentially of an inert, physiologically compatible pharmaceutical carrier and one dosage unit of the active ingredient, such as tablets, coated pills, hypodermic solutions, suppositories, orally ingestible suspensions, and the like. The average dosage unit of the compounds according to the present invention is 0.15–17 mgm./kg. body weight, preferably 0.3–8.0 mgm./kg. body weight.

In addition to the novel pyridobenzodiazepines, such dosage unit compositions may also contain one dosage unit of one or more other active ingredients, such as an expectorant, a broncho-spasmolytic and/or an analgesic, as illustrated in Example 32 below.

The following examples illustrate various dosage unit compositions comprising a compound according to the present invention as an active ingredient. The parts are parts by weight unless otherwise specified.

Example 27.—Tablets

The tablet composition is compounded from the following ingredients:

| | Parts |
|---|---|
| 5 - (α-dimethylamino-ethyl)-5,6-dihydro-6-oxo-11H-pyrido[2,3-b][1,4]benzodiazepine | 25.0 |
| Colloidal silicic acid | 10.0 |
| Corn starch | 21.0 |
| Lactose | 60.0 |
| Tartaric acid | 1.0 |
| Polyvinylpyrorlidone | 2.0 |
| Magnesium stearate | 1.0 |
| Total | 120.0 |

*Compounding procedure.*—The pyridobenzodiazepine compound, the silicic acid, the lactose and the corn starch are thoroughly admixed with each other, and the mixture is moistened with an aqueous 8% solution of the polyvinylpyrrolidone which also has the tartaric acid dissolved therein. The moist composition is granulated by passing it through a 1.0 mm.-mesh screen, and the granulate is dried at 45° C. The dry granulate is again passed through the 1.0 mm.-mesh screen and is then thoroughly admixed with the magnesium stearate. The finished composition is pressed into 120 mgm.-tablets. Each tablet contains 25 mgm. of the active ingredient.

Example 28.—Hypodermic solution

The solution is compounded from the following ingredients:

| | Parts |
|---|---|
| 5 - (β - dimethylamino - ethyl)-5,6-dihydro-6-oxo-11H-pyrido[2,3-b][1,4]benzodiazepine | 25.0 |
| Sodium chloride | 10.0 |
| Citric acid·H₂O | 4.0 |
| Second. sodium phosphate·H₂O | 6.0 |
| Distilled water q.s.ad 2000.0 parts by vol. | |

*Compounding procedure.*—The citric acid, the sodium phosphate, the sodium chloride and the pyridobenzodiazepine compounds are succesively dissolved in a sufficient amount of distilled water, the solution is diluted to the indicated volume with additional distilled water and is then filtered until free from suspended particles. The solution is filled into 2 cc. white ampules, and the ampules are sterilized for 20 minutes at 120° C. and sealed. Each ampule contains 25.0 mgm. of the active ingredient.

Example 29.—Coated tablets

The tablet core is compounded from the following ingredients:

| | Parts |
|---|---|
| 5 - methyl - 5,6 - dihydro - 6 - oxo - 11H-pyrido[2,3-b][1,4]benzodiazepine | 50.0 |
| Second. calcium phosphate | 155.0 |
| Corn starch | 30.0 |
| Gelatin | 5.0 |
| Talcum | 8.0 |
| Magnesium stearate | 2.0 |
| Total | 250.0 |

*Compounding procedure.*—The pyridobenzodiazepine compound, the calcium phosphate and the corn starch are thoroughly admixed with each other, and the mixture is moistened with an aqueous 10% solution of the gelatin. The moist mass is passed through a 1.5 mm.-mesh screen, and the resulting granulate is dried at 45° C. The dry granulate is again passed through the 1.5 mm.-mesh screen and is then thoroughly admixed with the talcum and the magnesium stearate. The composition is pressed into 250 mgm.-pill cores, which are then coated by well known methods with a thin shell consisting essentially of talcum and sugar. The coated tablets are finally polished with beeswax. Each coated tablet contains 50.0 mgm. of the active ingredient.

Example 30.—Suppositories

The suppository composition is compounded from the following ingredients:

| | Parts |
|---|---|
| 5 - ethyl - 5,6 - dihydro - 6 - oxo - 11H - pyrido[2,3-b][1,4]benzodiazepine | 50.0 |
| Cocoa butter | 1650.0 |
| Total | 1700.0 |

*Compounding procedure.*—The cocoa butter is melted, and the finely powdered pyridobenzodiazepine compound is stirred into the molten mass. The mixture is then cooled to about 37° C. and is poured into cooled suppository molds holding each 1700 mgm. of the mixture. Each suppository contains 50 mgm. of the active ingredient.

Example 31.—Suspension

The suspension is compounded from the following ingredients:

| | Parts |
|---|---|
| 5 - ethyl - 5,6 - dihydro - 6 - oxo - 11H-pyrido[2,3-b][1,4]benzodiazepine | 0.4 |
| Carboxymethyl cellulose, high viscosity | 0.5 |
| Colloidal silicic acid | 1.5 |
| p-Hydroxy-benzoic acid methyl ester | 0.07 |
| p-Hydroxy-benzoic acid propyl ester | 0.03 |
| Essence of cocoa | 1.5 |
| Sugar | 22.0 |
| Glycerin | 10.0 |
| Distilled water | 74.0 |
| Total | 110.0 |

*Compounding procedure.*—The distilled water is heated to about 80° C., the p-hydroxy-benzoic acid esters are dissolved therein, and the silicic acid is stirred into the solution. Thereafter, a mixture of the sugar and the carboxymethyl cellulose is added, and the mass is cooled to room temperature. The glycerin and the essence of cocoa are added to the cooled solution. Finally, the finely powdered pyridobenzodiazepine compound is stirred in, and the mixture is homogenized. 5 cc. of the suspension contains 20 mgm. of the active ingredient. The suspension is particularly adapted for oral administration to children.

Example 32.—Combination-compositions comprising more than one active ingredient (a) *Coated pills.*—The pill cores are compounded from the following ingredients:

| | Parts |
|---|---|
| 5 - methyl - 5,6 - dihydro - 6 -oxo - 11H - pyrido[2,3-b][1,4]benzodiazepine | 40.0 |
| N - (2 - amino - 3,5 - dibromobenzyl) - N - methyl-cyclohexylamine hydrochloride | 5.0 |
| 1 - (3,5 - dihydroxy - phenyl) - 2 - isopropylamino-ethanol sulfate | 10.0 |
| Ascorbic acid | 50.0 |
| Lactose | 75.0 |
| Potato starch | 20.0 |
| Polyvinylpyrrolidone | 10.0 |
| Corn starch | 9.0 |
| Magnesium stearate | 1.0 |
| Total | 220.0 |

*Compounding procedure.*—The pyridobenzodiazepine compound, the cyclohexylamine compound, the aminoethanol compound, the lactose and the potato starch are thoroughly admixed with each other, and the mixture is moistened with an aqueous 20% solution of the polyvinylpyrrolidone in ethanol. The moist composition is passed through a 1.5 mm.-mesh screen, and the resulting granulate is dried at 40° C. The dry granulate is again passed through the screen and is then admixed with the ascorbic acid, the corn starch and the magnesium stearate. The resulting mixture is pressed into 220 mgm. pill cores, which are subsequently coated with a thin shell consisting essentially of talcum and sugar. Each coated tablet contains 40.0 mgm. of the pyridobenzodiazepine compound, 5.0 mgm. of the cyclohexylamine compound and 10.0 mgm. of the amino-ethanol compound.

(b) *Tablets.*—The tablet composition is compounded from the following ingredients:

| | Parts |
|---|---|
| 5 - ethyl - 5,6 - dihydro - 6 - oxo - 11H - pyrido[2,3-b][1,4]benzodiazepine | 50.0 |
| Codeine phosphate | 15.0 |
| N - (2 - amino - 3,5 - dibromo - benzyl)-N-methyl-cyclohexylamine hydrochloride | 4.0 |
| Lactose | 114.0 |
| Corn starch | 30.0 |
| Gelatin | 5.0 |
| Magnesium stearate | 2.0 |
| Total | 220.0 |

*Compounding procedure.*—The pyridobenzodiazepine compound, the codeine phosphate, the cyclohexylamine compound, the lactose and the corn starch are thoroughly admixed with each other, and the mixture is moistened with an aqueous 12.5% solution of the gelatin, and the moist composition is passed through a 1.5 mm.-mesh screen. The resulting granulate is dried at 40° C., again passed through the screen and then admixed with the magnesium stearate. The composition is finally pressed into 220 mgm. tablets. Each tablet contains 50.0 mgm. of the pyridobenzodiazepine compound, 15.0 mgm. of codeine phosphate and 4.0 mgm. of the cyclohexylamine compound.

Although the above dosage unit composition examples illustrate only three specific compounds of the present invention as active ingredients, it should be understood that any of the other compounds embraced by Formula I above or their non-toxic, pharmacologically acceptable acid addition salts may be substituted for the particular pyridobenzodiazepines in Examples 27 through 32. Similarly, the amount of active ingredient may be varied within the dosage unit limits indicated above, and the amounts and nature of the inert ingredients may be varied to meet particular requirements.

While the present invention has been illustrated with the aid of certain specific examples, it will be readily apparent to others skilled in the art that the invention is not limited to those particular embodiments, and that various changes and modifications may be made without departing from the spirit of the invention or the scope of the appended claims.

I claim:

1. A compound of the formula

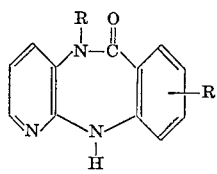

wherein
R is hydrogen, alkyl of 1 to 4 carbon atoms or

D—X— where X is alkylene of 1 to 3 carbon atoms and D is phenyl, chlorophenyl or

where $R_2$ and $R_3$ are methyl or, together with each other and the adjacent nitrogen atom, piperidino or morpholino, and
$R_1$ is hydrogen, chlorine or methyl,
or a non-toxic, pharmacologically acceptable acid addition salt thereof.

2. A compound of the formula

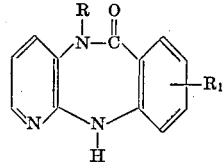

wherein
R is hydrogen, alkyl of 1 to 4 carbon atoms, β-dimethylamino-ethyl, γ-dimethylamino-n-propyl, benzyl, p-chlorobenzyl, piperidino-ethyl or morpholino-ethyl, and
$R_1$ is hydrogen, chlorine or methyl,
or a non-toxic, pharmacologically acceptable acid addition salt thereof.

3. A compound of the formula

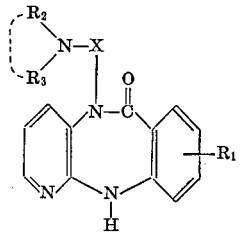

wherein
$R_1$ is hydrogen, chlorine or methyl,
$R_2$ and $R_3$ are methyl or, together with each other and the adjacent nitrogen atom, piperidino or morpholino, and
X is alkylene of 1 to 3 carbon atoms,
or a non-toxic, pharmacologically acceptable acid addition salt thereof.

4. A compound according to claim 1, wherein R and $R_1$ are hydrogen.

5. The hydrobromide of a compound according to claim 1, wherein R and $R_1$ are hydrogen.

6. A compound according to claim 1, wherein R is hydrogen and $R_1$ is 9-chloro.

7. A compound according to claim 1, wherein R is hydrogen and $R_1$ is 8-methyl.

8. A compound according to claim 1, wherein R is methyl and $R_1$ is hydrogen.

9. A compound according to claim 1, wherein R is ethyl and $R_1$ is hydrogen.

10. A compound according to claim 1, wherein R is ethyl and $R_1$ is 9-chloro.

11. A compound according to claim 1, wherein R is β-dimethylamino-ethyl and $R_1$ is hydrogen.

12. A compound according to claim 1, wherein R is β-dimethylamino-ethyl and 9-chloro.

13. A compound according to claim 1, wherein R is β-dimethylamino-ethyl and $R_1$ is 8-methyl.

14. A compound according to claim 1, wherein R is γ-dimethylamino-n-propyl and $R_1$ is 8-methyl.

15. A process for the preparation of a compound of the formula

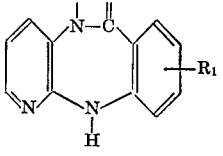

wherein
$R_1$ is hydrogen, halogen, lower alkyl, trifluoromethyl, methoxy, methylmercapto or acetyl,
which comprises reacting a 2-halo-3-amino-pyridine of the formula

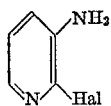

wherein Hal is a halogen, with a reactive derivative of an o-nitrobenzoic acid compound of the formula

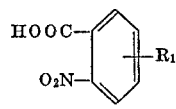

wherein R is hydrogen, halogen, lower alkyl, trifluoromethyl, methoxy, methylmercapto or acetyl, in the presence of an inert organic solvent and at a temperature between room temperature and the boiling point of said solvent to form a 2-halo-3-(2'-nitro-benzoylamino)-pyridine compound of the formula

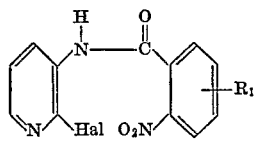

wherein $R_1$ and Hal have the meanings previously defined, hydrogenating said 2-halo-3-(2'-nitro-benzoylamino)-pyridine compound at a temperature of 20 to 100° C.. to form a 2-halo-3-(2'-amino-benzoylamino)-pyridine compound of the formula

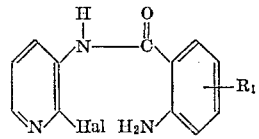

wherein $R_1$ and Hal have the meanings previously defined, heating said 2-halo-3-(2'-amino-benzoylamino)-pyridine compound to a temperature above 200° C. until hydrogen halide evolution begins, and separating the reaction product.

References Cited

UNITED STATES PATENTS 3,326,900   6/1967   Schmidt _____ 260—239.3

JAMES A. PATTEN, *Primary Examiner.*

R. T. BOND, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,406,170                      October 15, 1968

Anthony J. Papa

It is certified that error appears in the above identified patent and that said Letters Patent are hereby corrected as shown below:

Column 13, line 26, "$CO_2R_{19}$" should read -- $CO_2R_{10}$ --.

Signed and sealed this 24th day of February 1970.

(SEAL)
Attest:

Edward M. Fletcher, Jr.                WILLIAM E. SCHUYLER, JR.
Attesting Officer                         Commissioner of Patents